(12) United States Patent
Sprenger et al.

(10) Patent No.: US 12,320,446 B2
(45) Date of Patent: Jun. 3, 2025

(54) PRESSURE REGULATOR VALVE ASSEMBLY FOR QUICK DISCONNECT FITTINGS

(71) Applicant: Intel Corporation, Santa Clara, CA (US)

(72) Inventors: Mark Edmund Sprenger, Tigard, OR (US); Devdatta Prakash Kulkarni, Portland, OR (US); Joseph A. Broderick, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 885 days.

(21) Appl. No.: 17/164,670

(22) Filed: Feb. 1, 2021

(65) Prior Publication Data

US 2021/0190218 A1 Jun. 24, 2021

(51) Int. Cl.
| | |
|---|---|
| *F16L 37/00* | (2006.01) |
| *F16K 5/16* | (2006.01) |
| *F16K 47/04* | (2006.01) |

(52) U.S. Cl.
CPC .............. *F16K 5/161* (2013.01); *F16K 47/04* (2013.01); *F16L 37/006* (2013.01)

(58) Field of Classification Search
CPC . F16L 29/04; F16L 37/34; F16L 37/35; F16L 37/42; F16K 17/205; F16K 17/30; F16K 17/28
See application file for complete search history.

(56) References Cited

U.S. PATENT DOCUMENTS

| | | | | |
|---|---|---|---|---|
| 5,085,246 | A * | 2/1992 | Griinke | F16K 17/30 137/504 |
| 5,215,113 | A | 6/1993 | Terry | |
| 5,613,518 | A * | 3/1997 | Rakieski | F16K 17/30 137/513.5 |
| 5,647,398 | A * | 7/1997 | Giesler | F16L 29/04 251/359 |
| 6,148,858 | A | 11/2000 | Kirkman | |
| 6,374,852 | B1 * | 4/2002 | Olivas | F16K 17/30 137/493.9 |
| 7,213,613 | B2 | 5/2007 | Spakowski et al. | |
| 9,528,650 | B2 | 12/2016 | Tiberghien et al. | |
| 9,769,954 | B2 | 9/2017 | Bonnin et al. | |

(Continued)

FOREIGN PATENT DOCUMENTS

| | | | | | |
|---|---|---|---|---|---|
| CN | 108458145 | A | * | 8/2018 | |
| CN | 110486553 | A | * | 11/2019 | F16L 29/04 |

(Continued)

OTHER PUBLICATIONS

Machine English translation of CN108458145A (Year: 2024).*

(Continued)

*Primary Examiner* — Hailey K. Do
(74) *Attorney, Agent, or Firm* — Alliance IP, LLC

(57) ABSTRACT

A quick disconnect fitting includes a plug and a socket to receive the plug. The plug includes a fluid channel, an inlet to the fluid channel, and a pressure regulating valve assembly. The valve can include a poppet, and a valve nozzle comprising an orifice. The valve assembly resides in the fluid channel. The socket includes a socket stem to contact the valve assembly and push the valve assembly into the fluid channel of the plug upon the socket receiving the plug.

21 Claims, 9 Drawing Sheets

(56) References Cited

U.S. PATENT DOCUMENTS

| | | | |
|---|---|---|---|
| 2007/0246108 A1 | 10/2007 | Conway | |
| 2013/0112286 A1 | 5/2013 | Kirouac et al. | |
| 2014/0174594 A1 | 6/2014 | Frenal et al. | |
| 2017/0059076 A1* | 3/2017 | Hasunuma | F16K 17/04 |
| 2017/0101849 A1* | 4/2017 | Silva | E21B 34/10 |
| 2019/0195407 A1 | 6/2019 | Sprenger et al. | |

FOREIGN PATENT DOCUMENTS

| | | | | |
|---|---|---|---|---|
| FR | 2716250 A1 * | 8/1995 | | F16K 17/30 |
| JP | H11100750 A | 4/1999 | | |
| KR | 1020180006766 A | 1/2018 | | |
| WO | WO-0188420 A1 * | 11/2001 | | F16K 1/12 |

OTHER PUBLICATIONS

Machine English translation of CN110486553A (Year: 2024).*
Machine English translation of FR2716250A1 (Year: 2024).*
Machine English translation of WO0188420A1 (Year: 2024).*
PCT International Search Report and Written Opinion issued in PCT/US2021/065770, dated May 2, 2022; 13 pages.

* cited by examiner

PRESSURE REGULATOR VALVE ASSEMBLY FOR QUICK DISCONNECT FITTINGS

BACKGROUND

Couplings used in cooling systems or other applications may facilitate repair, upgrading, servicing, and/or replacement of components with minimal downtime. Liquid cooling systems may use various couplings depending on, among other things, the type of cooling system and the working fluid(s) used therein.

Figure 1:
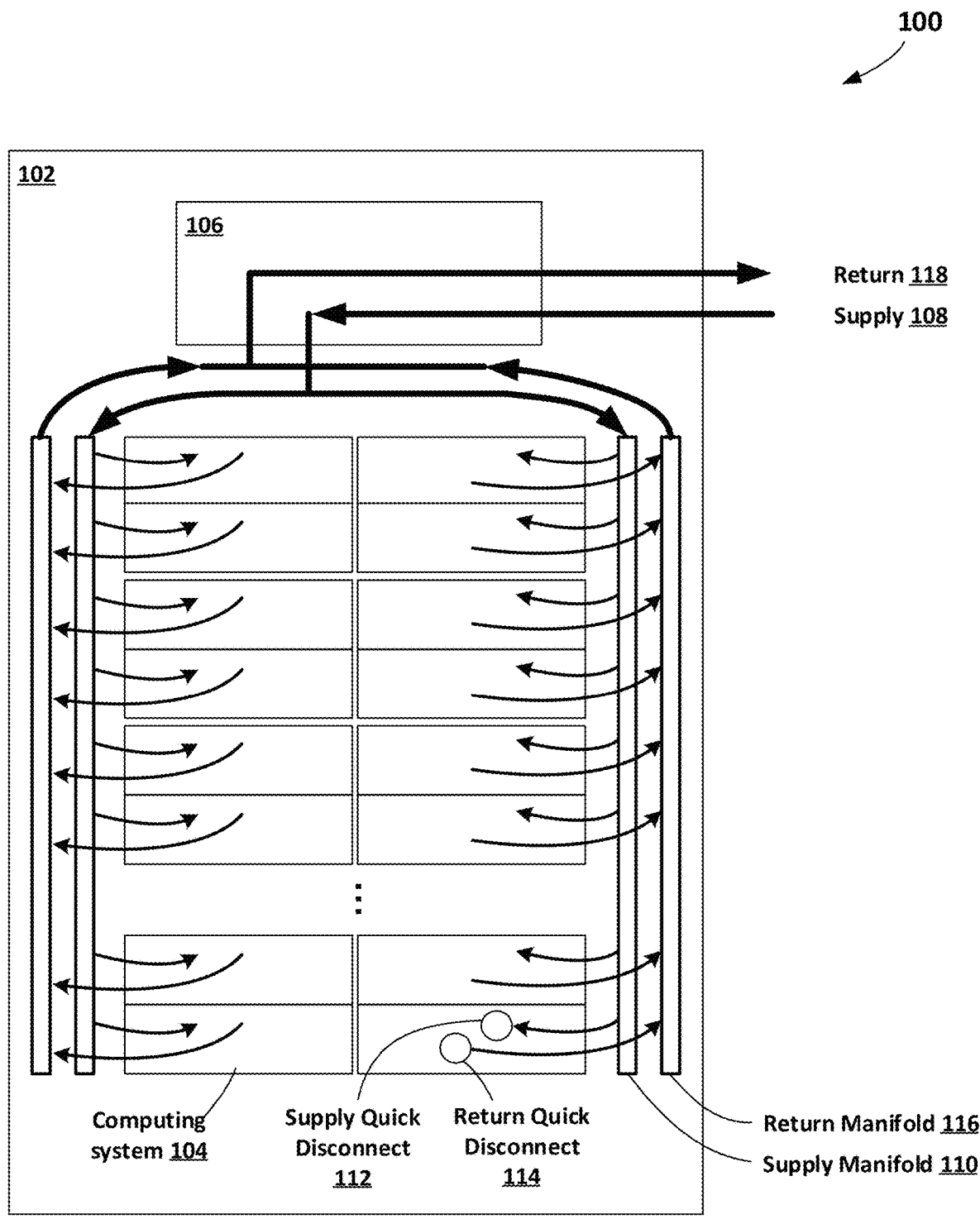
FIG. 1 is a schematic diagram of a rack that includes a liquid cooling system and utilizes quick disconnect fittings that include pressure-regulating valve assemblies in accordance with embodiments of the present disclosure.

Figures are not drawn to scale.

DETAILED DESCRIPTION

This disclosure describes a pressure regulator valve assembly (or pressure regulating valve assembly) for use in quick disconnect fittings used in the liquid cooling of computing system components, such as processor units in rack computing solutions (e.g., blades, trays, sleds). Liquid cooling is a highly effective way to increase the performance of processor units and other computing system components (e.g., memory, storage), in part because of the increased thermal cooling capability provided by a liquid-cooled system versus an air-only cooling system. Quick disconnect (or quick connect, quick release, etc.) couplings or fittings are used to connect a fluid manifold supported by a rack to the cooling loops of the computing systems (e.g., servers) also supported by the rack. Each manifold may have many fluid loops connected to it. Each of these fluid loops has its own flow resistance, which may be significantly different from other fluid loops in the same manifold. This difference in flow resistance can cause maldistribution of fluid in the loops and may require unnecessary pump power to ensure the loops receive appropriate flow rates.

This disclosure describes a pressure-regulating valve with a quick disconnect coupling to reduce system-level pressure variations. The pressure-regulating valve can be integrated into a quick disconnect coupling at low cost. Other advantages are readily apparent to those of skill in the art. Among the various advantages include the low cost of integration of precision nozzle outlets in quick disconnect fitting valve assemblies, lower overall cost of cold plate-based liquid cooling solutions, reduced number of components to implement pressure regulation of fluids entering computing systems, and increased reliability of rack-level liquid cooling solutions. In embodiments, the pressure-regulating valve allows the tuning of individual loops to optimize fluid distribution.

Additional advantages include facilitating a simple, low-cost method to reduce facility line or information technology (IT) secondary fluid line pressure to acceptable levels for cooling distribution units (CDUs) or heat exchangers (HXs) or cold plates and assemblies. The pressure regulating valve assemblies and quick disconnect fittings utilizing these valve assemblies disclosed herein can reduce the number of components required to enable and procure a liquid-cooled system. The pressure-regulating valve assembly and quick disconnect fitting design metrics and parameters can be chosen based on existing quick disconnect designs.

The quick disconnect fitting and pressure-regulating valve assemblies can be chosen based on the pressure rating needed for that system and can be replaced to handle a different pressure rating in the field as needed. No matter which CDU or facility IT loop is connected, the pressure-regulating valve assemblies can maintain desired fluid pressures linking to the system (e.g., CDU or rack computing systems).

One can theoretically measure the liquid volumetric flow rate through each computing system in a rack by simple pressure drop taps due to the use of the nozzle outlet and valve channel. Currently, if one needs to measure flow rate through each computing system, costly in-line flow meters may need to be used. Selling computing systems with liquid cooling utilizing the quick disconnect fittings disclosed herein can help original design manufacturers (ODMS) and original equipment manufacturers (OEMs) in that liquid cooling solutions will meet safety requirements regardless of the type of computing system the quick disconnect fittings are connected to.

In this disclosure, the terms "valve" and "valve assembly" refer to devices that control the flow of fluid through a fluid channel. Controlling the flow of fluid can include pressure balancing the fluid in case of a pressure imbalance on either side of the valve or valve assembly. In embodiments, the term "poppet" is used to describe the valve assembly's general shape.

FIG. 1 is a schematic diagram 100 of a rack 102 that includes a liquid cooling system and utilizes quick disconnect fittings that include pressure-regulating valve assemblies in accordance with embodiments of the present disclosure. Rack 102 can mechanically support one or more computing systems 104 (e.g., server computing systems). Each computing system 104 can comprise a case that houses one or more computing system components, such as one or more processor units, memory, routing hardware, storage, fans, peripherals, switches, interconnects, add-in cards, etc. A computing system 104 can include a liquid cooling system to provide cooling to one or more computing system components housed within a case. A computing system 104 can include a liquid supply quick disconnect coupling 112 and a liquid return quick disconnect coupling 114. The supply and return quick disconnect couplings 112 and 114 for one computing system 104 can connect to one or more conduits that form a loop to route incoming cooling liquid to one or more cold plates attached to one or more computing system components for cooling the computing system components and to route the heated liquid out of the computing system 104 through the return quick disconnect coupling.

As used herein, the terms "processor unit" and "processing unit" can refer to any processor, processor core, component, module, engine, circuitry, or any other processing element described or referenced herein. A processor unit can take various forms such as a central processing unit (CPU), a graphics processing unit (GPU), general-purpose GPU (GPGPU), accelerated processing unit (APU), field-programmable gate array (FPGA), neural network processing unit (NPU), data processor unit (DPU), accelerator (e.g., graphics accelerator, digital signal processor (DSP), compression accelerator, artificial intelligence (AI) accelerator), controller, or other types of processing units. As such, the processor unit can be referred to as an XPU (or xPU). Further, a processor unit can comprise one or more of these various types of processing units. In some embodiments, the computing system comprises one processor unit with multiple cores, and in other embodiments, the computing system comprises a single processor unit with a single core.

In some embodiments, the rack 102 is located in a data center, such as an enterprise data center (e.g., a data center owned and operated by a company and typically located on company premises), managed services data center (e.g., a data center managed by a third party on behalf of a company), a colocated data center (e.g., a data center in which data center infrastructure is provided by the data center host and a company provides and manages their own data center components (servers, etc.)), cloud data center (e.g., a data center operated by a cloud services provider that host companies applications and data), and an edge data center (e.g., a data center, typically having a smaller footprint than other data center types, located close to the geographic area that it serves).

The rack 102 can support a liquid cooling system for the computing systems 104. The liquid cooling system can include a cooling distribution unit (CDU) 106. CDU 106 can include a liquid supply line 108 and a liquid return line 118. A supply manifold 110 delivers cooling liquid from CDU 106 to computing systems 104 in the rack 102 and a return manifold 116 delivers heated cooling liquid from computing systems 104 to the CDU 106.

Liquid-cooled systems require a cooling IT loop or facility water connection (supply line) to connect to the respective cold plates inside computing systems 104, Cooling Distribution Units (CDUs) 106, or Heat Exchangers (HXs) present in the system. The liquid (e.g., water) supply line 108 in a typical water-cooled data center is maintained at a high-pressure level capable of overcoming the pressure drop of the system and maintaining the required flow rate for system cooling requirements. In order to safely provide fluid to individual cold plates inside rack computing systems, CDUs, or HXs, the fluid pressure is reduced via a pressure-regulating valve prior to entering the CDU or HX. As per the International Electrotechnical Commission (IEC) standard, any liquid-cooled systems must not leak under 5× operating pressure.

This disclosure describes pressure regulating valve assemblies that have a "poppet" architecture for use in quick disconnect fittings in liquid cooling solutions. The valve assemblies are used in a quick disconnect plug of a quick disconnect fitting and incorporate a pintle and a valve nozzle. The valve nozzle comprises a nozzle outlet and the valve nozzle and pintle define a valve channel for the valve assembly. The volume of the valve channel and the size of the nozzle outlet can be determined to control or reduce the pressure through a quick disconnect fitting based on operational parameters of a liquid cooling system or other factors. The quick disconnect plug connects to a quick disconnect socket to form a quick disconnect fitting. In a disconnected stage, the pressure regulating valve assembly prevents drips by seating the valve assembly in a fluid inlet of a quick disconnect plug.

In some embodiments, in an engaged state, the valve assembly rests against a plug spring. The nozzle outlet of the valve assembly is maintained at a desired opening volume through which fluid can pass. When there is a short burst of pressure increase, such as can occur immediately after a quick disconnect plug is connected to a quick disconnect socket, the valve assembly is pushed against the plug spring, which can reduce the volume of the valve channel volume while maintaining a desired fluid pressure downstream of the valve assembly. After the incoming high fluid pressure transient has passed, the plug spring pushes the valve assembly back to its seated position against the quick disconnect socket and the valve assembly continues to regulate fluid pressure at original valve flow coefficient (Cv) values. As the volume of the valve channel volume is spring-based, the fluid pressure regulation is automatic, passive, and quick, allowing cold plate and computing system-level liquid cooling components to be designed for quick disconnect fittings utilizes the pressure-regulating valve assemblies disclosed herein for various applications. This can help reduce the cost and weight of computing systems while still meeting International Electrotechnical Commission (IEC)/Underwriters Laboratories Inc. (UL) safety guidelines.

In some embodiments, the valve assembly can include a pressure regulating spring (or pintle spring) between the pintle and the nozzle. The pintle spring can compress under high-pressure conditions to restrict flow through the nozzle outlet. The poppet can include a pressure relief channel. When the poppet is unseated under high-pressure conditions, the pressure relief channel is exposed and permits fluid flow at controlled rates.

The aforementioned embodiments, among others, are described in more detail below.

Figure 2:
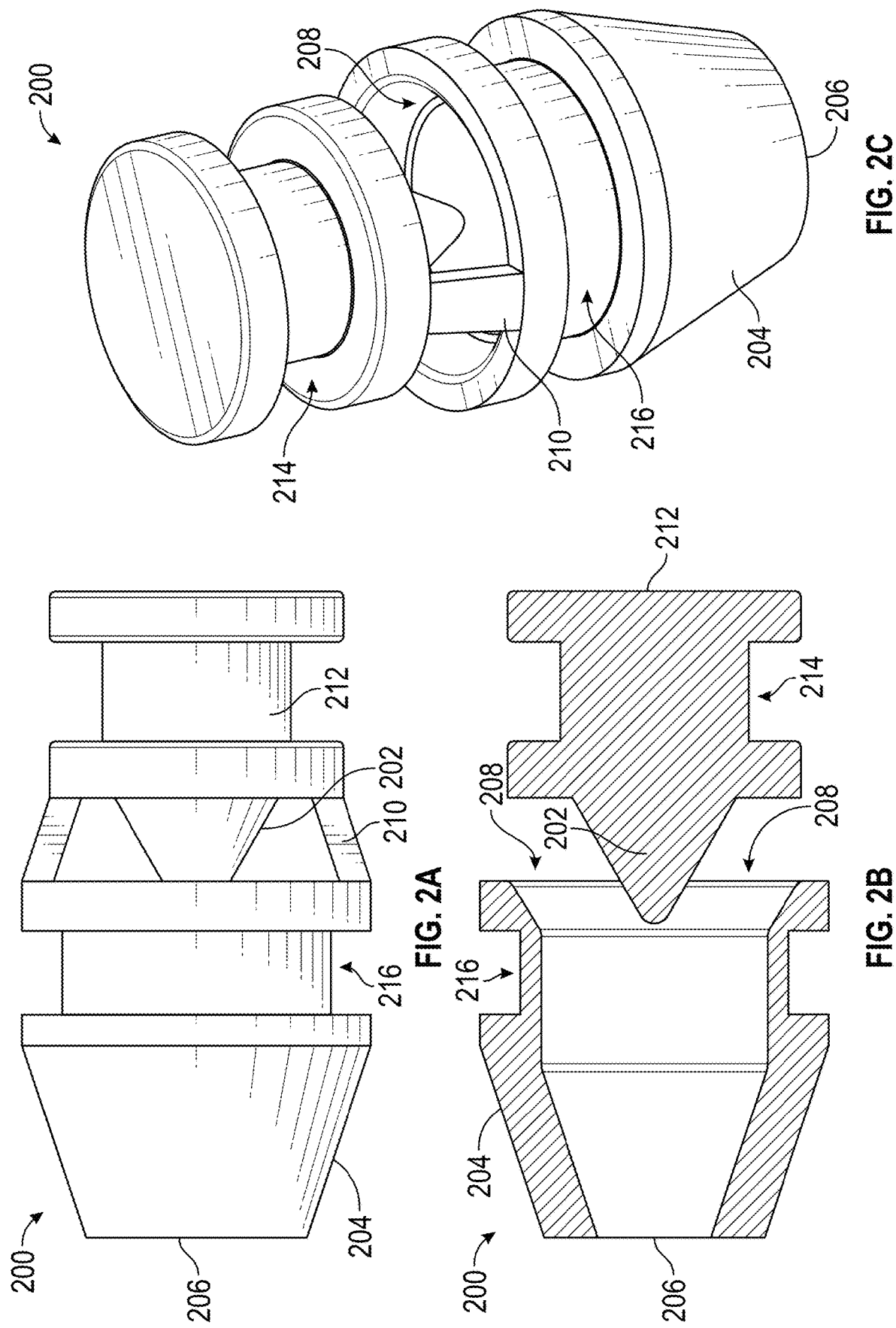
FIGS. 2A-C are various views of a pressure regulator valve assembly in accordance with embodiments of the present disclosure.

FIGS. 2A-C are various views of a pressure regulator valve assembly 200 in accordance with embodiments of the present disclosure. FIG. 2A is a side view of a pressure regulator valve assembly 200. FIG. 2B is a cross-sectional view of the pressure regulator valve assembly 200. FIG. 2C is an isometric view of the pressure regulator valve assembly 200. Pressure regulator valve assembly 200 (or simply, valve assembly 200) can include a pintle 202 and a valve nozzle 204. The pintle 202 (also referred to as a pressure dampening pintle) can extend from a body 212. Body 212 can be substantially cylindrical and sized to fit into a fluid inlet and fluid channel of a quick disconnect plug. The body 212 can include a recess 214 to accommodate an O-ring. The O-ring (shown later) can prevent drips from the plug while the plug is disconnected from a quick disconnect socket.

The pintle 202 can have different shapes and aspect ratios. In embodiments, the pintle 202 can be mushroom-shaped, conical, tapered, tapered spherical, semi-spherical, etc. The size and shape of the pintle 202 can be selected based on operating pressures of a liquid cooling system. The pintle 202 and the valve nozzle 204 can cooperate to create a valve channel 208 that extends through the valve nozzle 204 and a nozzle outlet 206. The valve channel 208 can have a volume that is determined based on the operational and pressure requirements of the liquid cooling system. The valve channel is shown specifically in the cross-sectional view in FIG. 2B.

The pintle 202 can be coupled to the valve nozzle by a connective member 210. Connective member 210 can be flexible so that pintle 202 can move inwards towards the valve nozzle 204 to reduce the opening of the valve channel 208 and restrict fluid flow in a high-pressure situation. In some embodiments, a pintle spring can be used instead of a connective member 210. Other structures can also be used to achieve similar results.

In some embodiments, the valve nozzle 204 includes a recess 216 to accommodate an O-ring.

Figure 3:
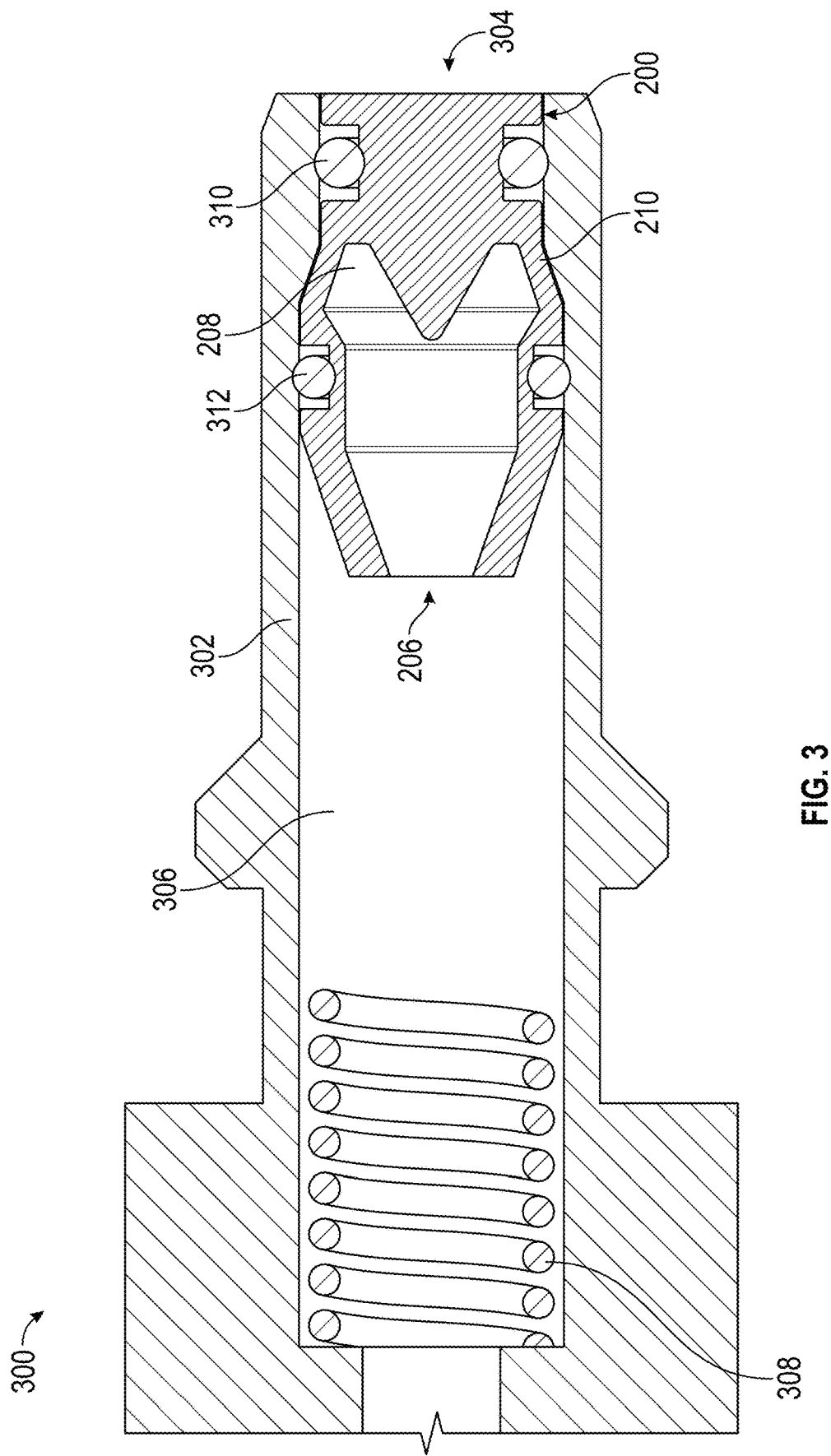
FIG. 3 is a schematic diagram of an example quick disconnect plug that includes a pressure regulator valve assembly in accordance with embodiments of the present disclosure.

FIG. 3 is a schematic diagram of an example quick disconnect plug 300 that includes a pressure regulator valve assembly 200 in accordance with embodiments of the present disclosure. The quick disconnect plug 300 can carry liquid to cool one or more processor units and/or other components of a computing system. The quick disconnect plug 300 includes a plug body 302 that can be received into a quick disconnect socket and secured into the socket without leaking. Together, the quick disconnect plug 300 and a corresponding quick disconnect socket comprises a quick disconnect fitting. The plug body 302 includes a fluid inlet 304. Fluid inlet 304 allows fluid to flow from the quick disconnect socket into a fluid channel 306 in the plug body 302. Plug body 302 can include features that allow for quick connection and disconnection of the quick disconnect plug 300 from a quick disconnect socket. A pressure regulator valve assembly 200 resides within the fluid channel 306.

Figure 4:
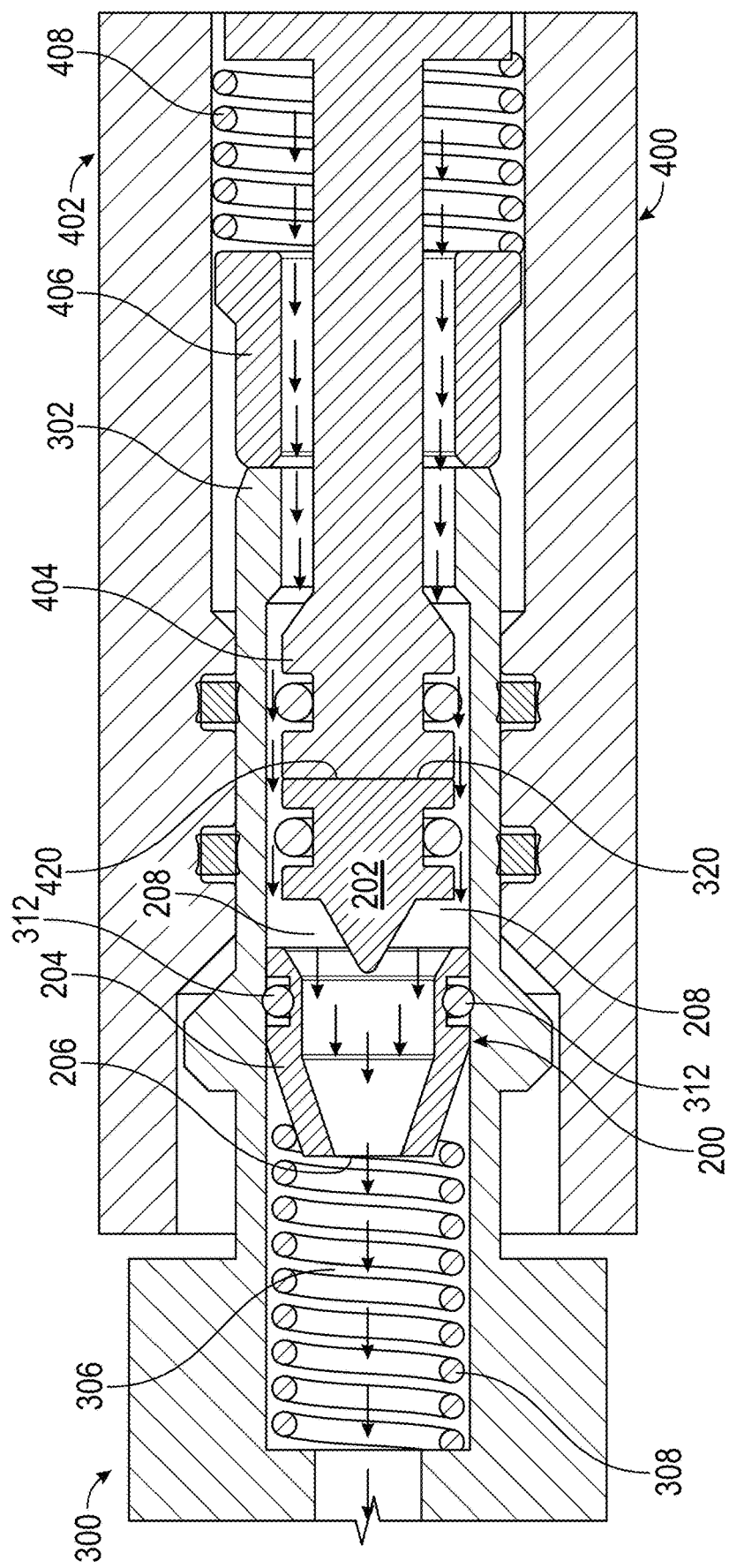
FIG. 4 is a schematic diagram of a quick disconnect plug with a pressure regulating valve assembly coupled to a quick disconnect socket 400 in accordance with embodiments of the present disclosure.
Figure 5:
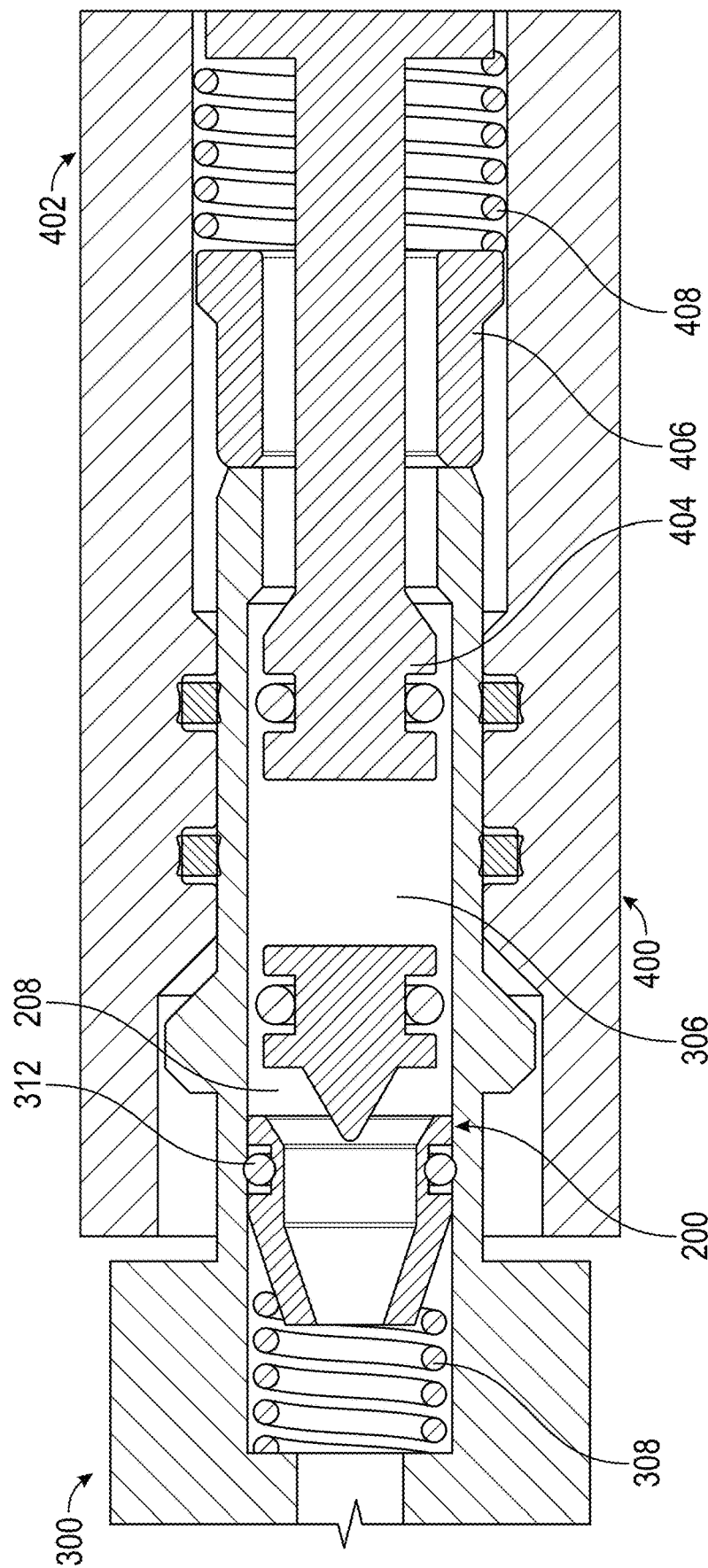
FIG. 5 is a schematic diagram of a quick disconnect fitting plug coupled to a quick disconnect socket and a pressure regulator valve assembly in the plug under pressure in accordance with embodiments of the present disclosure.

FIG. 3 shows a pressure regulator valve assembly 200 in a position within the fluid channel 306 when the plug 300 is not coupled to a socket. It is understood that when the plug 300 is not connected to a socket, the pressure regulator valve assembly 200 is positioned proximate the fluid inlet 304 of the plug to prevent leakage. O-ring 310 seals the fluid inlet 304. In the disconnected state, the valve assembly O-ring 310 prevents drips by seating the valve assembly 200 in the fluid inlet 304 of the plug 300. In embodiments, O-ring 312 also prevents drips by sealing against a wall of the fluid channel 306. FIGS. 4 and 5 illustrate the plug 300 connected to a socket.

FIG. 4 is a schematic diagram of a quick disconnect plug with a pressure regulating valve assembly coupled to a quick disconnect socket 400 in accordance with embodiments of the present disclosure. The socket 400 includes a socket body 402. Socket body 402 can include a receptacle to receive the plug 300 to allow the passage of fluid from the socket through the plug without leaks at or up to a predetermined pressure. The socket 400 also includes quick connect and/or quick disconnect features.

Within the socket body 402 is a socket spring 408 and a plunger 406. A portion of the plug body 302 can push on the plunger 406 which is resisted by the socket spring 408 to cause a plug face 320 to be seated against a socket face 420. The arrows represent fluid flow direction.

The socket 400 includes a socket stem 404. When the plug 300 is connected to socket 400, the socket stem 404 pushes the pressure regulator valve assembly 200 into the fluid channel 306 and against the plug spring 308. The socket stem 404 is rigidly affixed within the socket body 402. FIG. 4 illustrates a no pressure or relatively low-pressure example. Under no pressure or relatively low-pressure conditions (or operational conditions within an ideal tolerance), the pressure regulator valve assembly 200 is seated against the socket stem 404.

FIG. 5 is a schematic diagram of a quick disconnect fitting plug coupled to a quick disconnect socket and a pressure regulator valve assembly in the plug under pressure in accordance with embodiments of the present disclosure. As can be seen in FIG. 5, when fluid is flowing through the quick disconnect fitting from the socket to the plug at high pressure, the pressure regulator valve assembly 200 is pushed away from the socket stem 404. The fluid pressure pushes the pressure regulator valve assembly 200 further against plug spring 308, which increases a volume of the fluid channel 306 between the pressure regulator valve assembly 200 and the socket stem 404. The liquid flow can be controlled by a change in the volume of the valve channel 208 volume due to the pintle 202 being pushed towards the valve nozzle 204 by the high-pressure liquid due to a flexible connective member connecting the pintle 202 to the valve nozzle 204 or a pintle spring located between the pintle 202 and the valve nozzle 204. When the high-pressure subsides, the plug spring 308 pushes the valve assembly 200 back to the seated position against the socket stem 404 (as shown in FIG. 4).

O-ring 312 is shown in FIGS. 3-5. O-ring 312 prevents fluid from flowing around the valve assembly 200 and helps to direct fluid into the valve channel 208.

Figure 6:
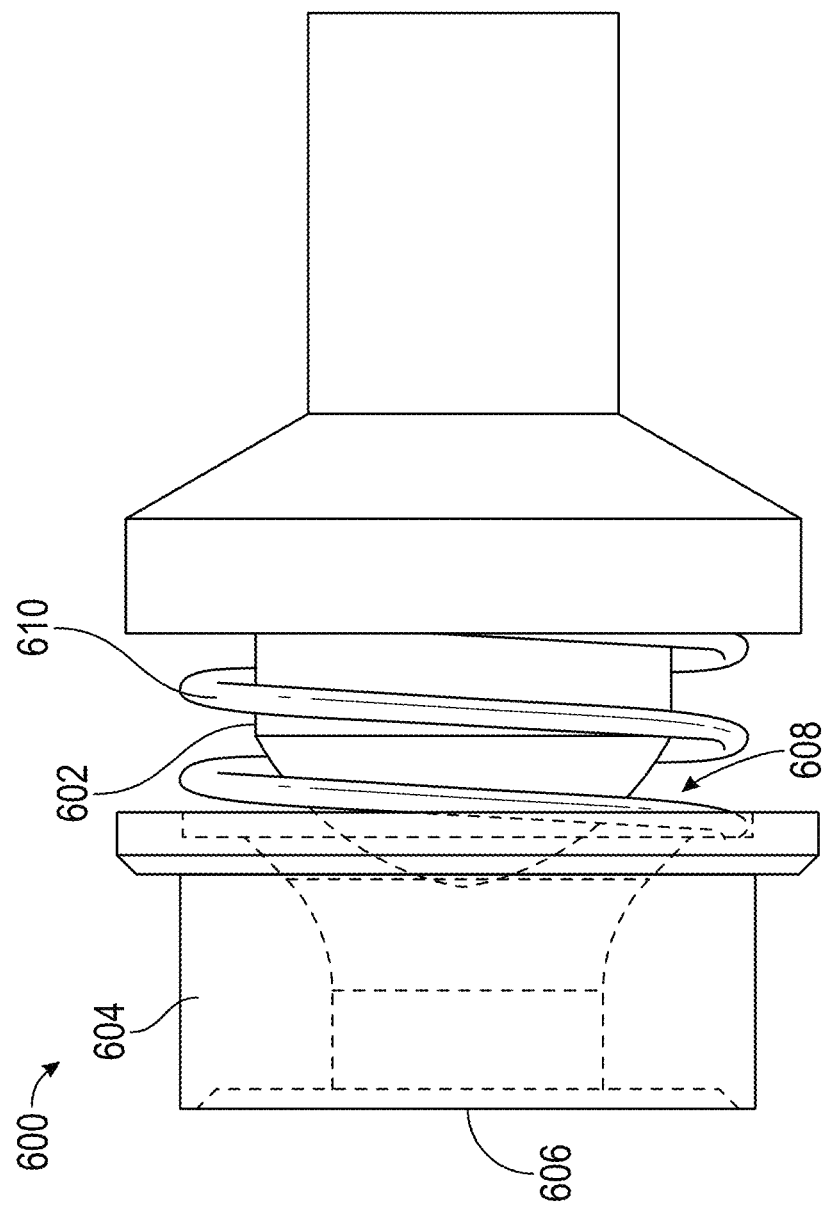
FIG. 6 is a schematic diagram of an example pressure regulator valve in accordance with embodiments of the present disclosure.

FIG. 6 is a schematic diagram of an example pressure regulator valve assembly 600 in accordance with embodiments of the present disclosure. Pressure regulator valve assembly 600 is similar to that shown in FIGS. 2A-C. Pressure regulator valve assembly 600 includes a pintle 602 and a valve nozzle 604. Valve nozzle 604 includes an outlet 606 through which fluid flowing through a valve channel 608 exits the valve nozzle 604.

The pintle 602 is shown to be a slightly different shape and aspect ratio than shown in FIGS. 2A-C. As mentioned previously, the pintle shape and size of a pressure regulating valve assembly can be selected based on operational parameters.

The valve assembly 600 includes a pintle spring 610. Pintle spring 610 can couple the pintle 602 with the valve nozzle 604. Pintle spring 610 can compress when the pintle experiences high fluid pressure causing the valve assembly 600 to become unseated and the volume of the valve channel 608 to decrease. In some embodiments, the pintle 602 includes a low-pressure fluid bypass channel 612 that extends from a surface of the pintle 602 to the valve channel 608 (shown in FIGS. 7 and 8).

Figure 7:
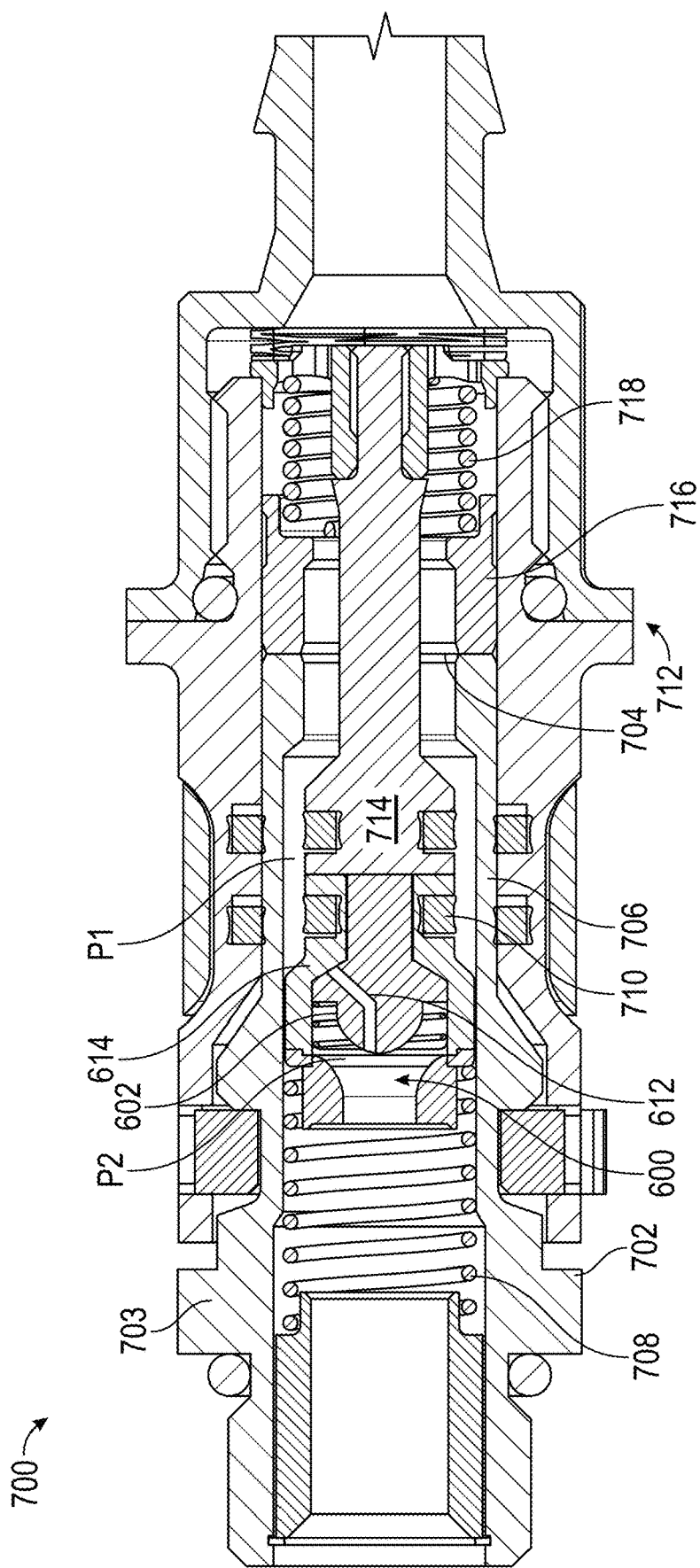
FIG. 7 is a schematic diagram of a quick disconnect fitting comprising a pressure regulator valve assembly 600 in accordance with embodiments of the present disclosure.

FIG. 7 is a schematic diagram of a quick disconnect fitting 700 comprising a pressure regulator valve assembly 600 in accordance with embodiments of the present disclosure. FIG. 7 illustrates a no- or low-pressure situation. The quick disconnect fitting 700 includes a plug 702 connected to a socket 712. The plug 702 is similar to plug 300. Socket 712 is similar to socket 400.

Plug 702 includes a plug body 703 that can be received into a quick disconnect socket 712 and secured into the socket 712 without leaking. The plug 702 includes a fluid inlet 704. Fluid inlet 704 allows fluid to flow from the socket 712 into a fluid channel 706. Plug 702 can include features that allow for quick connection and disconnection of the plug 702 from socket 712.

Plug 702 includes a valve assembly 600 (shown with low-pressure fluid bypass channel 612). Valve assembly 600 is shown to reside in fluid channel 706 (against plug spring 708 when the plug 702 is connected to the socket 712).

The socket 712 can include a receptacle for receiving the plug 300 to allow the passage of fluid from the socket through the plug without leaks at or up-to a predetermined pressure. The socket 712 also includes the features for quick connect and/or disconnect.

Within the socket 712 is a socket spring 718 and a plunger 716. A portion of the plug 702 can push on the plunger 716, which is resisted by the socket spring 718 to seat the plug 702 against the socket 712.

The socket 712 includes a socket stem 714. When the plug 702 is connected to socket 712, the socket stem 714 pushes the pressure regulator valve assembly 600 into the fluid channel 706 and against the plug spring 708. The socket stem 714 is rigidly affixed within the socket 712. FIG. 7 illustrates a no pressure or relatively low-pressure example. Under no pressure or relatively low-pressure conditions (or operational conditions within an ideal tolerance), the pressure regulator valve assembly 600 is seated against the socket stem 714. As pressure fluctuates at the system level, the size of the valve assembly fluid outlet remains constant and increased fluid pressure causes the valve assembly 600 to be displaced laterally within the plug fluid channel within the quick disconnect fitting 700. That is, the valve assembly 600 can slide within the fluid channel in response to varying fluid pressure conditions upstream from the valve assembly.

The valve assembly 600 can include a holder 614. Holder 614 can house the pintle 602. The pintle 602 can include a low-pressure fluid bypass channel 612 that extends from a surface of the pintle to the valve channel 608. When seated, the pintle 602 seats against the holder 614 and the socket stem 714, which seals the low-pressure fluid bypass channel 612.

The holder 614 can also include a recess to accommodate the O-ring (e.g., O-ring 710 in FIG. 7). The O-ring 710 can create a seal in fluid inlet 704 of plug 702.

Figure 8:
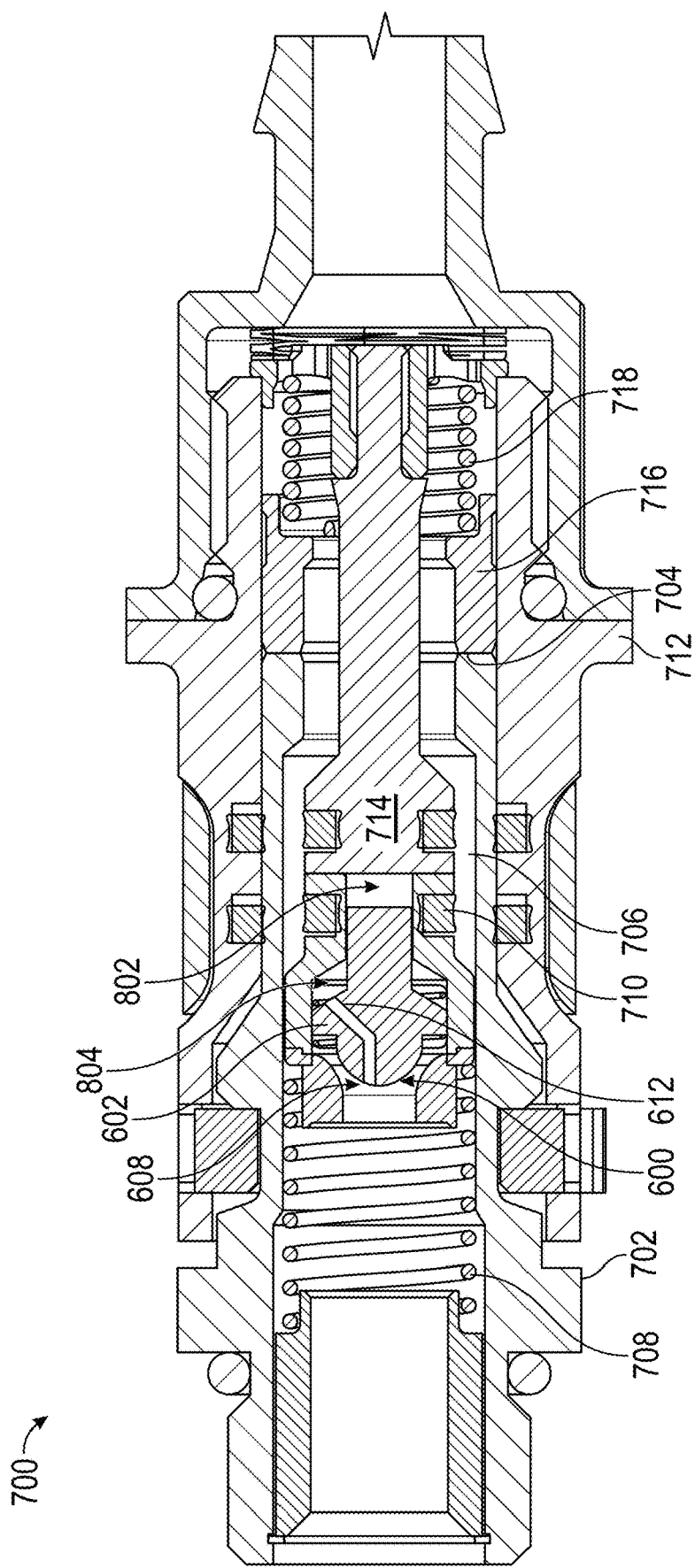
FIG. 8 is a schematic diagram of a quick disconnect fitting plug and socket coupled together and a pressure regulator valve under pressure in accordance with embodiments of the present disclosure.

FIG. 8 is a schematic diagram of a quick disconnect fitting 700 and a pressure regulator valve assembly 600 under high fluid pressure in accordance with embodiments of the present disclosure. As can be seen by FIG. 8, under high pressure, the valve assembly 600 unseats from the socket stem 714. The fluid pressure pushes the pressure regulator valve assembly 600 against plug spring 708, which increases a volume of the fluid channel 706 between the pressure regulator valve assembly 600 and the socket stem 714. Volumes 802 and 804 in FIG. 8 represent portions of the plug's fluid channel exposed under high-pressure conditions. The valve channel 608 in the valve nozzle 604 is shown to be reduced. The liquid flow can be controlled by the change in the valve channel 608 volume due to the pintle 602 being pushed towards the valve nozzle 604 by the high-pressure liquid. When the high pressure subsides, the plug spring 708 pushes the valve assembly 600 back to the seated position against the socket stem 714 (as shown in FIG. 7).

Referring back to FIG. 7, under high-pressure conditions, a pressure drop occurs between P1, the fluid pressure upstream of the valve assembly, and P2, the fluid pressure downstream from the valve assembly, with P1 being greater than P2. If P1 is much greater than P2 (e.g., a water hammer event occurs), then the pressure will push the pintle 602 and the pintle spring 610 will compress. The repositioning of the pintle 602 closer to the valve nozzle 604 reduces the valve channel volume and reduces fluid flow. The spring force of pintle spring 610 can be chosen based on the pressure balancing requirements and operational parameters of the liquid cooling system.

When the pintle 602 unseats from up against the socket stem 714, the low-pressure fluid bypass channel 612 will be exposed to the lower pressure P2 in volume 804 in FIG. 8. When the pressures P1 and P2 are balanced, the plug spring 708 will then force the pintle 602 back into the seated position up against the plunger 716. Plug spring 708 can include a spring force that is chosen based on the flow requirements, pressure balancing requirements, and/or other operational concerns for the liquid cooling system.

Figure 9:
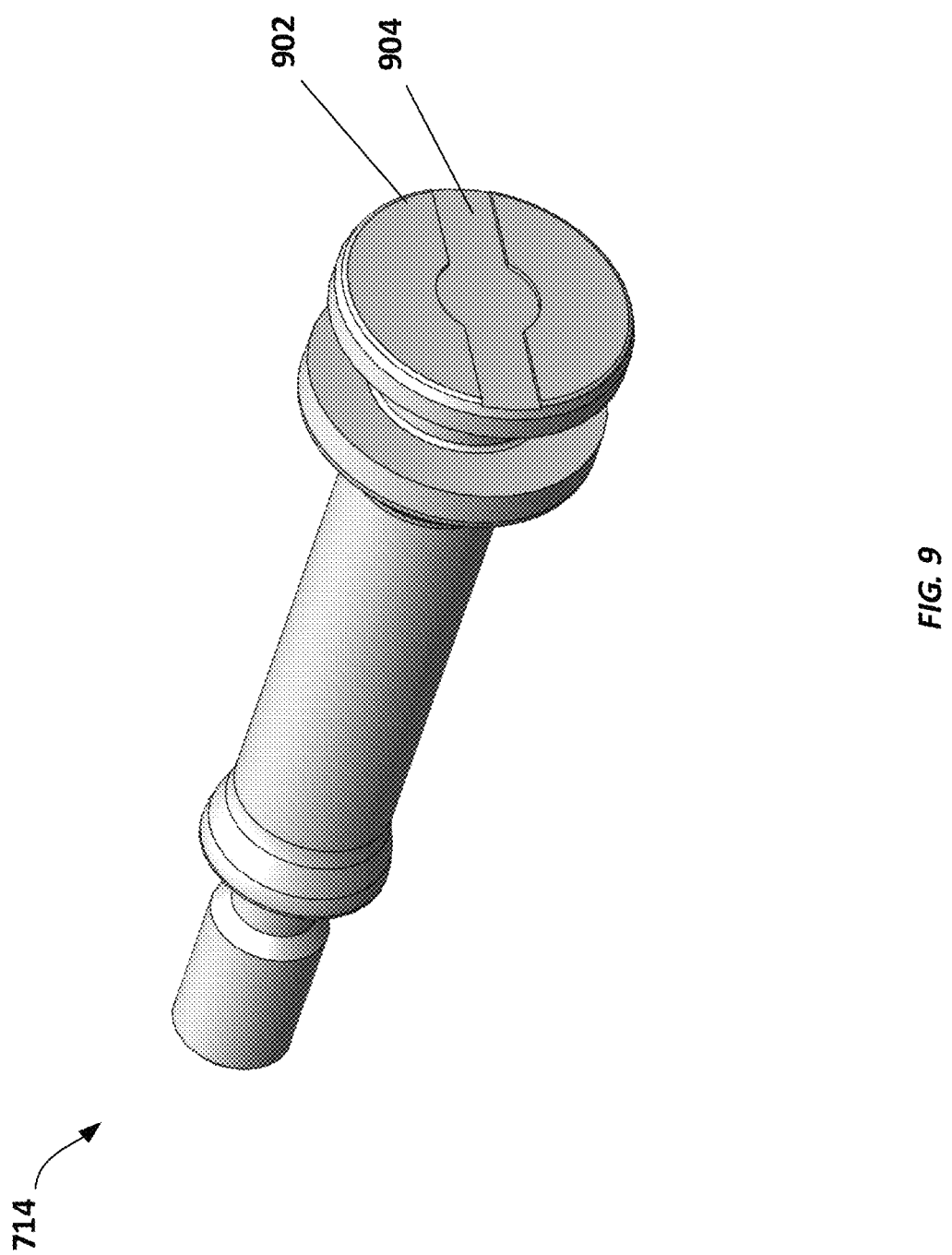
FIG. 9 is a schematic diagram of an example socket stem that includes a high-pressure relief surface in accordance with embodiments of the present disclosure.

FIG. 9 is a schematic diagram of an example socket stem 714 that includes a high-pressure relief surface in accordance with embodiments of the present disclosure. Socket stem 714 can include a seating surface 902 that can interact with valve assembly 200 or valve assembly 600. The seating surface 902 can contact the valve assembly and push the valve assembly into the fluid channel when the plug is connected to the socket. In no- or low-pressure conditions, the valve assembly is seated against seating surface 902.

The seating surface 902 can include a high-pressure relief surface 904. The high-pressure relief surface 904 can be milled or cut into the seating surface 902. The high-pressure relief surface 904 can allow high-pressure liquid to contact the pintle 602 or 202 and unseat the pintle 602 or 202 from the seated position.

In some embodiments, a quick disconnect plug can comprise plug sensors that generate plug sensor data that can be monitored to determine plug performance. For example, a force sensor can be used to monitor the amount of compression of a plug spring. In another example, one or more position sensors (e.g., Hall sensor, proximity sensor) can be used to detect a position of a valve assembly within the plug body. If monitored plug sensor data meets a criterion, an alert can be generated. For example, an alert can be generated if force sensor data generated by a force sensor exceeds a spring compression threshold value indicating that the spring has compressed by more than a threshold amount. In another example, an alert can be generated if position sensor data generated by a position sensor indicates that the valve assembly has been pushed past a certain point in the plug body by liquid flowing into the plug. Such alerts can indicate the presence of a high-pressure event in the plug (e.g., a water hammer event). The monitoring of plug sensor data can be performed by the computing system. The alert can be provided to the operating system of the computing system to which the plug is attached and/or a remote orchestrator (e.g., network function virtualization orchestrator (NFVO)). For example, in response to an alert, the computing system could shut itself down or the orchestrator could take one or more of various actions, such as causing the computing system to shut down, causing a CDU to which the computing system is attached to shut down, cause the CDU to reduce the amount of liquid flowing to the computing system, and moving jobs executing on the computing system to another computing system in the same rack or a different rack.

In general, this disclosure pertains to a pressure regulating valve assembly and the placement of the valve assembly in quick disconnect fitting plugs. The valve assembly has a valve channel whose volume can change dynamically based on fluid pressure conditions within the quick disconnect fitting.

The following pertains to further examples.

Example 1 is a quick disconnect plug comprising: a fluid channel; a fluid inlet; and a valve assembly comprising: a pintle; and a valve nozzle comprising an outlet, the pintle and valve nozzle defining a valve channel, the valve channel having a volume that can decrease in response to high-pressure fluid entering the fluid inlet; the valve assembly residing within the fluid channel, the quick disconnect plug to carry liquid to cool one or more processor units of a computing system.

Example 2 comprises the quick disconnect plug of Example 1, further comprising a plug spring within the fluid channel, the valve assembly residing between the plug spring and the fluid inlet.

Example 3 comprises the quick disconnect plug of Example 2, the valve assembly to slidably move toward the plug spring in response to high-pressure fluid entering the fluid inlet.

Example 4 comprises the quick disconnect plug of Example 1, wherein the valve assembly comprises a pintle spring between the pintle and the valve nozzle.

Example 5 comprises the quick disconnect plug of Example 1, wherein the pintle comprises a low-pressure fluid bypass channel.

Example 6 comprises the quick disconnect plug of Example 1, wherein the pintle is coupled to the valve nozzle by a flexible member.

Example 7 comprises the quick disconnect plug of Example 1, further comprising an O-ring surrounding a portion of the pintle or a portion of the valve nozzle.

Example 8 is a quick disconnect fitting comprising: a quick disconnect plug comprising: a fluid channel; a fluid inlet, and a valve assembly comprising: a pintle; and a valve nozzle comprising an outlet, the pintle and valve nozzle defining a valve channel, the valve channel having a volume that can decrease in response to high-pressure fluid entering the fluid inlet; the valve assembly residing within the fluid channel; and a quick disconnect socket to receive the quick disconnect plug, the quick disconnect socket comprising a socket stem to contact the valve assembly and push the valve assembly into the fluid channel upon the quick disconnect socket receiving the quick disconnect plug; the quick disconnect fitting to carry liquid to cool one or more processor units in a computing system.

Example 9 comprises the quick disconnect fitting of Example 8, wherein the socket stem comprises a seating surface to contact the valve assembly and a high-pressure relief surface cut into the seating surface, the high-pressure relief surface to allow high-pressure liquid to contact the pintle.

Example 10 comprises the quick disconnect fitting of Example 8, wherein the quick disconnect socket comprises a plunger, the quick disconnect plug to push against the plunger when the quick disconnect plug is received into the quick disconnect socket.

Example 11 comprises the quick disconnect fitting of Example 8, wherein the valve assembly comprises a pintle spring between the pintle and the valve nozzle.

Example 12 comprises the quick disconnect fitting of Example 8, wherein the pintle comprises a low-pressure fluid bypass channel.

Example 13 comprises the quick disconnect fitting of Example 12, wherein the low-pressure fluid bypass channel extends from a surface of the pintle into the valve channel.

Example 14 comprises the quick disconnect fitting of Example 8, the quick disconnect plug comprising a plug spring in the fluid channel, the valve assembly residing between the plug spring and the fluid inlet, the socket stem to push the valve assembly against the plug spring when the quick disconnect plug is connected to the quick disconnect socket.

Example 15 comprises the quick disconnect fitting of Example 14, the valve assembly to slidably move toward the plug spring in response to high-pressure fluid entering the fluid inlet.

Example 16 is a computing system comprising: a quick disconnect plug comprising: a fluid channel; a fluid inlet; and a valve assembly comprising: a pintle; and a valve nozzle comprising an outlet, the pintle and valve nozzle defining a valve channel, the valve channel having a volume that can decrease in response to high-pressure fluid entering the fluid inlet, the valve assembly residing in the fluid channel; and one or more processor units cooled by liquid that enters the quick disconnect plug.

Example 17 comprises the computing system of Example 16, the quick disconnect plug further comprising a plug spring within the fluid channel, the valve assembly residing between the plug spring and the fluid inlet.

Example 18 comprises the computing system of Example 17, the valve assembly to slidably move toward the plug spring in response to high-pressure fluid entering the fluid inlet.

Example 19 comprises the computing system of Example 16, wherein the valve assembly comprises a pintle spring between the pintle and the valve nozzle.

Example 20 comprises the computing system of Example 16, wherein the pintle comprises a low-pressure fluid bypass channel.

Example 21 comprises the computing system of Example 16, further comprising an O-ring surrounding a portion of the pintle or a portion of the valve nozzle.

Example 22 comprises the computing system of Example 16, wherein the computing system is located in a rack.

Example 23 comprises the computing system of Example 22, wherein the quick disconnect plug is connected to a quick disconnect socket that is connected to a supply manifold that supplies cooling liquid to one or more additional computing systems in the rack.

Example 24 is a quick disconnect plug comprising: a fluid channel; a fluid inlet; and a pressure regulation means located within the fluid channel to maintain a fluid pressure downstream from the pressure regulation means under varying fluid pressures upstream from the pressure regulation means.

In the description and claims, the terms coupled and connected, along with their derivatives, may be used. In particular examples, connected may be used to indicate that two or more elements are in direct physical or electrical contact with each other. Coupled may mean that two or more elements are in direct physical or electrical contact. However, coupled may also mean that two or more elements may not be in direct contact with each other, but yet may still cooperate or interact with each other.

Reference in the specification to "one example" or "some examples" means that a particular feature, structure, or characteristic described in connection with the example is included in at least an implementation. The appearances of the phrase "in one example" in various places in the specification may or may not be all referring to the same example.

Although examples have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:
1. A quick disconnect plug comprising:
a fluid channel;

a plug spring within the fluid channel;
a fluid inlet; and
a valve assembly comprising:
a pintle; and
a valve nozzle comprising an outlet, the pintle and the valve nozzle defining a valve channel, the valve channel having a volume that can decrease in response to high-pressure fluid entering the fluid inlet, the valve assembly residing within the fluid channel, the pintle and the valve nozzle slidably movable within the fluid channel, the pintle and the valve nozzle residing between the plug spring and the fluid inlet, wherein the pintle and the valve nozzle are to slidably move toward the plug spring in response to high-pressure fluid entering the fluid inlet, the quick disconnect plug to carry liquid to cool one or more processor units of a computing system.

2. The quick disconnect plug of claim 1, wherein the valve assembly comprises a pintle spring between the pintle and the valve nozzle.

3. The quick disconnect plug of claim 1, wherein the pintle comprises a fluid bypass channel that extends from a surface of the pintle at a first end of the fluid bypass channel to the valve channel at a second end of the fluid bypass channel, wherein the first end of the fluid bypass channel is not exposed to fluid entering the fluid inlet when fluid enters the fluid inlet at a first fluid pressure and the first end of the fluid bypass channel is exposed to fluid entering the fluid inlet when the fluid enters the fluid inlet at a second fluid pressure, the second fluid pressure greater than the first fluid pressure.

4. The quick disconnect plug of claim 1, wherein the pintle is coupled to the valve nozzle by a flexible member.

5. The quick disconnect plug of claim 1, further comprising an O-ring surrounding a portion of the valve nozzle.

6. A quick disconnect fitting comprising:
a quick disconnect plug comprising:
a fluid channel;
a fluid inlet, and
a valve assembly comprising:
a pintle; and
a valve nozzle comprising an outlet, the pintle and the valve nozzle defining a valve channel, the valve channel having a volume that can decrease in response to high-pressure fluid entering the fluid inlet, the valve assembly residing within the fluid channel, the pintle and the valve nozzle slidably movable within the fluid channel; and
a quick disconnect socket to receive the quick disconnect plug, the quick disconnect socket comprising a socket stem to contact the valve assembly and push the valve assembly into the fluid channel upon the quick disconnect socket receiving the quick disconnect plug, the quick disconnect fitting to carry liquid to cool one or more processor units in a computing system.

7. The quick disconnect fitting of claim 6, wherein the socket stem comprises a seating surface to contact the valve assembly and a high-pressure relief surface cut into the seating surface, the high-pressure relief surface to allow high-pressure fluid to contact the pintle.

8. The quick disconnect fitting of claim 6, wherein the quick disconnect socket comprises a plunger, the quick disconnect plug to push against the plunger when the quick disconnect plug is received into the quick disconnect socket.

9. The quick disconnect fitting of claim 6, wherein the valve assembly comprises a pintle spring between the pintle and the valve nozzle.

10. The quick disconnect fitting of claim 6, wherein the quick disconnect plug comprises a plug spring in the fluid channel, the valve assembly resides between the plug spring and the fluid inlet, and the socket stem pushes the valve assembly against the plug spring when the quick disconnect plug is connected to the quick disconnect socket.

11. The quick disconnect fitting of claim 10, wherein the pintle and the valve nozzle are to slidably move toward the plug spring in response to high-pressure fluid entering the fluid inlet.

12. The quick disconnect fitting of claim 6, wherein the pintle comprises a fluid bypass channel.

13. The quick disconnect fitting of claim 12, wherein the fluid bypass channel extends from a surface of the pintle into the valve channel.

14. The quick disconnect fitting of claim 12, wherein the fluid bypass channel extends from a surface of the pintle at a first end of the fluid bypass channel to the valve channel at a second end of the fluid bypass channel, wherein the first end of the fluid bypass channel is not exposed to fluid entering the fluid inlet when fluid enters the fluid inlet at a first fluid pressure and the first end of the fluid bypass channel is exposed to fluid entering the fluid inlet when the fluid enters the fluid inlet at a second fluid pressure, the second fluid pressure greater than the first fluid pressure.

15. A computing system comprising:
a quick disconnect plug comprising:
a fluid channel;
a plug spring within the fluid channel;
a fluid inlet; and
a valve assembly comprising:
a pintle; and
a valve nozzle comprising an outlet, the pintle and the valve nozzle defining a valve channel, the valve channel having a volume that can decrease in response to high-pressure fluid entering the fluid inlet, the valve assembly residing in the fluid channel, the pintle and the valve nozzle slidably movable within the fluid channel, the pintle and the valve nozzle residing between the plug spring and the fluid inlet, wherein the pintle and the valve nozzle are to slidably move toward the plug spring in response to high-pressure fluid entering the fluid inlet; and
one or more processor units to be cooled by liquid that enters the quick disconnect plug.

16. The computing system of claim 15, wherein the valve assembly comprises a pintle spring between the pintle and the valve nozzle.

17. The computing system of claim 15, wherein the pintle comprises a fluid bypass channel that extends from a surface of the pintle at a first end of the fluid bypass channel to the valve channel at a second end of the fluid bypass channel, wherein the first end of the fluid bypass channel is not exposed to fluid entering the fluid inlet when fluid enters the fluid inlet at a first fluid pressure and the first end of the fluid bypass channel is exposed to fluid entering the fluid inlet when the fluid enters the fluid inlet at a second fluid pressure, the second fluid pressure greater than the first fluid pressure.

18. The computing system of claim 15, further comprising an O-ring surrounding a portion of the valve nozzle.

19. The computing system of claim 15, wherein the computing system is located in a rack.

20. The computing system of claim 19, wherein the quick disconnect plug is connected to a quick disconnect socket that is connected to a supply manifold that supplies cooling fluid to one or more additional computing systems in the rack.

21. A quick disconnect plug comprising:
   a fluid channel;
   a fluid inlet; and
   a valve assembly comprising:
      a pintle; and
      a valve nozzle comprising an outlet, the pintle and the valve nozzle defining a valve channel, the valve channel having a volume that can decrease in response to high-pressure fluid entering the fluid inlet, the valve assembly residing within the fluid channel, the pintle and the valve nozzle slidably movable within the fluid channel, the quick disconnect plug to carry liquid to cool one or more processor units of a computing system, wherein the pintle comprises a fluid bypass channel that extends from a surface of the pintle at a first end of the fluid bypass channel to the valve channel at a second end of the fluid bypass channel, wherein the first end of the fluid bypass channel is not exposed to fluid entering the fluid inlet when fluid enters the fluid inlet at a first fluid pressure and the first end of the fluid bypass channel is exposed to fluid entering the fluid inlet when the fluid enters the fluid inlet at a second fluid pressure, the second fluid pressure greater than the first fluid pressure.

* * * * *